Patented May 6, 1952

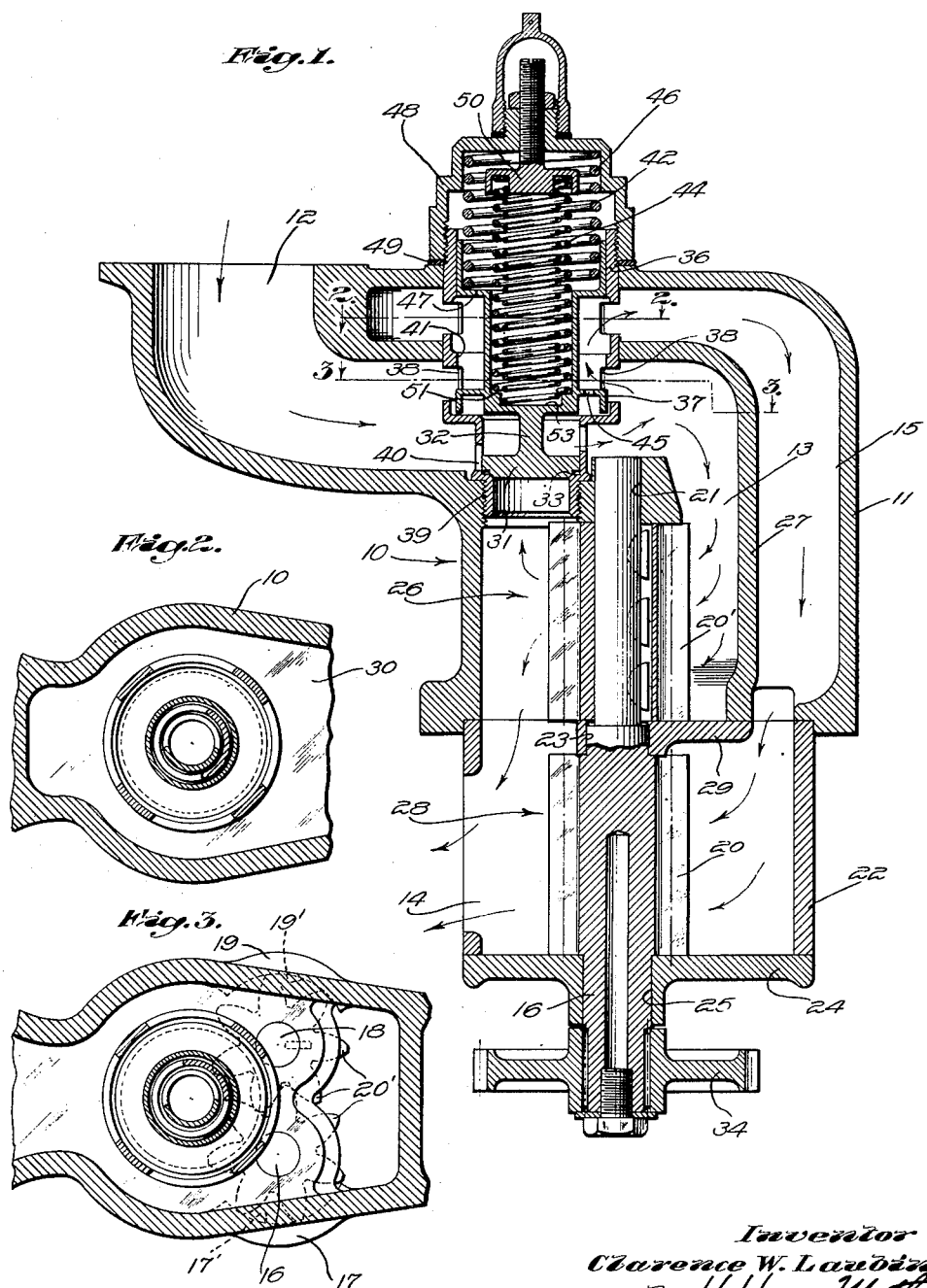

2,595,861

UNITED STATES PATENT OFFICE 2,595,861

PUMPING APPARATUS

Clarence W. Laubin, Snyder, N. Y., assignor to United Aircraft Corporation, East Hartford, Conn., a corporation of Delaware Application January 4, 1947, Serial No. 720,173

6 Claims. (Cl. 103—11)

This invention relates to pumps and in particular to a lubricating oil pumping apparatus for aircraft engines in which the quantity of oil pumped is automatically maintained substantially constant, regardless of variations in altitude, or of variations in the pressure of the ambient air.

An object of the invention is to provide a pumping apparatus comprising a pair of pumps and a control means for regulating the fluid input to one pump in accordance with changes in the output from both pumps.

Another object is to provide a pair of continuously driven pumps arranged in parallel in which the fluid flow through one pump is controlled by changes in the fluid pressure in a common outlet for both pumps.

Another object is to provide a pumping means including a main pump having a relief valve for controlling the discharge pressure thereof and a supplemental pump having a control means associated therewith for varying the quantity of fluid pumped by the supplemental pump in inverse relation to the quantity of fluid by-passed through the relief valve.

Other objects and advantages will be apparent from the specification and claims and from the drawing which illustrates what is now considered to be a preferred embodiment of the invention.

In the drawings, Fig. 1 is a central sectional view of a pumping apparatus made in accordance with the present invention.

Fig. 2 is a transverse sectional view taken on the plane of the line 2—2 in Fig. 1.

Fig. 3 is a similar view taken on the plane of the line 3—3 in Fig. 1.

Pressure oil pumps for aircraft engines are usually designed to furnish a predetermined oil pressure and oil flow at a predetermined design altitude. But conventional pumps when designed to meet the requirements of relatively high altitude operation have excess capacity at lower altitudes or at sea level. This excess capacity is usually taken care of by by-passing fluid through a relief valve from the pump outlet to the pump inlet; however, the by-passing or short circuiting of a large portion of the pump output in this manner results in a considerable waste of power and has other disadvantages such as increasing aeration of the lubricating oil.

According to the present invention, a pumping apparatus is provided which will supply the required rate of oil flow and the required oil pressure at both relatively high and relatively low altitudes, without involving the short circuiting or by-passing of an excessively large quantity of oil through a relief valve. A pair of continuously driven pumps connected in parallel are automatically controlled, according to the invention, so that both pumps are operated at full capacity when maximum pumping capacity is required, with the oil flow through one of the pumps being reduced when the operating conditions are such that the oil flow which would be supplied by both pumps operating at maximum capacity is greater than the oil flow required by the engine lubricating system.

In the embodiment of the invention illustrated in the drawing, the pumping apparatus is contained in a casing 10 having an inlet passage 12 for receiving lubricating oil from an oil supply tank and discharge passage 14 for delivering the oil under pressure to the lubricating system, or to the oil distributing pipes, of an aircraft engine, for instance a piston type radial engine. To facilitate assembly, casing 10 is preferably divided into two parts, a main body portion 11 and an auxiliary section or cap 22. A pair of shafts 16 and 18 is rotatably mounted on parallel axes within the casing, each shaft being supported by bearings in the body 11 and cap 22, as shown for shaft 16 at 21, 23 and 25, respectively. Each shaft has integral therewith at its lower end, within the cap 22, a spur gear 20 and these two gears are intermeshed to form an auxiliary gear pump 28. Another pair of spur gears 20' is keyed respectively to the shafts 16, 18 at their upper ends, within the body 11, and these two gears are intermeshed to form a main gear pump 26. Shaft 16, and consequently both pairs of intermeshing gears, is driven at a speed proportional to engine speed by the gear 34, splined to the lower end of shaft 16 and connected to the engine crankshaft by a gear train (not shown).

The two gears 20 and the two gears 20' are each partially enclosed by a pair of casing walls 17, 19 and the curved inner surfaces 17', 19' of these walls closely fit the outer periphery of the respective gears, in substantially fluid tight relationship thereto. Thus the gears 20 are so housed as to form a gear pump 28 for pumping fluid from an inlet passage 15 to the outlet passage 14 and the gears 20' are so housed as to form a gear pump 26 for pumping fluid from an inlet passage 13 to the outlet passage 14. The inlet passages 13, 15 are separated by partitions 27, 29 in the body 11 and cap 22 so that the pumps are supplied from individual inlets, though they discharge into a common outlet. However, the inlet passages are interconnected through ports 38 in a control valve 32 and they are both supplied from the main intake passage 12. Inlet 13 for pump 26 is directly connected to the main intake 12 at all times but the inlet 15 for pump 28 is so connected only at such times as valve ports 38 are fully or partially open.

Valve 32 not only controls admission of fluid from the intake conduit 12 to the conduit 15 leading to the supplementary pump 28 but also acts as a relief valve to control the outlet or pump discharge pressure in passage 14. The valve is slidably mounted in a valve casing 36, screwed at 39 into a wall of the pump casing 10. As the valve is raised or lowered in casing 36 an upper valve head 37 closes or opens ports 38 to decrease or increase the fluid flow from intake 12 to inlet 15, while a lower valve head 31 opens or closes port 40 to increase or decrease the amount of fluid by-passed from the outlet 14 to the intake 12.

In the lowermost position of valve 32 (the position shown in Fig. 1) ports 38 are fully open and fluid may flow freely from intake 12 to the supplementary pump inlet 15. The relief valve head 31, however, is closed, by engagement with seat 33. Consequently fluid discharged into outlet 14 by both the main pump 26 and the supplementary pump 28 is prevented from returning to the intake conduit 12. Under these conditions both pump inlets 13, 15 are fully open to the main intake 12, both pumps operate at full capacity, and the by-pass or relief valve is closed so that all the oil pumped passes to the lubricating system.

Valve 32 is resiliently urged or biased toward the lowermost position of Fig. 1 by three helical springs 42, 44 and 46 within the valve casing 36. Spring 46 is of relatively large diameter and has one end bearing against a shoulder 47 on the valve and its opposite end bearing against the end of a cap 48 threaded onto the top of casing 36. This cap abuts against a sealing ring 49, thereby sealing the joint between the main casing 10 and the valve casing 36. Springs 42 and 44 are retained in compression between separated shoulders 53, 51 on the valve 32 and an adjustable abutment 50 threaded through the top of the cap member 48. Adjustment of abutment 50 axially relative to the cap member 48 by means of its threaded connection with the cap enables the total spring pressure holding the valve 32 toward its lowermost position to be selected, or varied.

When the fluid pressure in the discharge conduit 14 increases to a value above that selected by the adjustment of the spring abutment 50 the valve 32 is moved upward within casing 36 by the pressure on head 31 against the force of springs 42, 44, 46 and the valve head 37 closes the ports 38 leading to the supplementary pump inlet 15. The amount of fluid admitted to and pumped by the pump 28 is therefore reduced. At the same time the lifting of relief valve head 31 opens port 40 between discharge conduit 14 and intake conduit 12 and enables a relatively small amount of fluid to by-pass from the pump outlet to the pump inlet.

An orifice or bleed 45 is preferably provided in the valve head 37 so the fluid flow from intake 12 to the supplementary pump inlet 15 never drops below a predetermined minimum, even though the valve head 37 may be fully closed with respect to the seat 41. Thus a small quantity of fluid is always permitted to flow through the supplementary pump to avoid cavitation or instability which might otherwise occur if it were operated with its inlet passage completely throttled.

*Operation*

When the engine is started both the main and supplementary pumps are operated simultaneously until a predetermined discharge pressure (selected by adjustment of spring abutment 50) is reached in conduit 14. Valve 32 is then gradually lifted by the outlet oil pressure against the spring force and the valve head 37 gradually throttles the inlet 15 for the supplementary pump 28 by closing ports 38. This reduces the volume of oil admitted to the supplementary pump and decreases the total amount of oil pumped by both pumps into the outlet passage 14, which tends to effect a decrease in the pump discharge pressure. As the valve lifts the relief valve head 31 raises from seat 33 and opens the port 40, thereby providing a by-pass between the pump outlet and the pump inlet, which also acts to reduce the pump discharge pressure. Thus the pump discharge pressure is maintained at a substantially constant value by the combined action of the relief valve head 31 and the inlet control valve head 37.

At sea level valve 32 will normally be forced a considerable distance upwardly because at high ambient air pressures the main pump 26 alone takes care of most or all of the pumping load. The ports 38 will be wholly or partially closed and only a small quantity of oil will be pumped by the supplementary pump 28. Some oil is by-passed through port 40.

As the aircraft ascends the flow through both pumps, and particularly the main pump, decreases because of the reduction in the oil pressure in the intake 12, due to the decrease in ambient air pressure. The resulting reduction in discharge pressure enables the springs to gradually close the valve 32 which tends to return, or maintain, the pump discharge pressure and the quantity of oil pumped (by increasing the flow through pump 28) to their predetermined values.

At the design altitude valve 32 is normally in its bottom position, with maximum flow through pump 28 (as well as pump 26) and no oil being by-passed. The pump discharge pressure may be slightly less than at sea level under such conditions; however, by proper design of valve 32 and selection of the valve spring rate only a slight change in discharge pressure need be required to provide for raising or lowering of the control valve.

As the aircraft descends from the design altitude valve 32 is opened gradually, in the manner explained above, so as to prevent any material increase in pump discharge pressure or quantity of oil pumped, by opening the relief port 40 and closing the supplementary pump inlet ports 38.

It is to be understood that the invention is not limited to the specific embodiment herein illustrated and described, but may be used in other ways without departure from its spirit as defined by the following claims.

I claim:

1. In a pumping apparatus, a main pump and a supplemental pump arranged in parallel and having a common discharge conduit, and a valve actuated by the fluid in said discharge conduit for controlling the flow through said supplemental pump.

2. Oil pumping means comprising a casing having a single discharge conduit, a main pump and a supplemental pump within said casing, an inlet passage for said supplemental pump, a pressure responsive relief valve for said main pump, and means associated with said relief valve for controlling the flow through said inlet passage.

3. A pumping mechanism comprising a casing having a single intake conduit and a single discharge conduit, a main pump and a supplemental pump within said casing, an inlet passage for said supplementary pump leading from the single intake conduit, a relief valve connecting said discharge conduit with said intake conduit, and means including said valve for at least partially closing said inlet passage when the pressure in said discharge conduit reaches a predetermined maximum.

4. In an aircraft engine, a conduit adapted to be connected with the oil distributing passages of the engine lubricating system, a main pump and a supplemental pump, for pumping oil into said conduit, a relief valve for by-passing oil from said conduit to the inlet for said main pump, resilient means for forcing said valve toward its closed position, and a control valve actuated by said relief valve for regulating the quantity of fluid pumped by said supplemental pump.

5. In an oil pressuring apparatus for aircraft engines, a pair of continuously driven pumps arranged in parallel, a constantly open intake for one of said pumps, and means responsive to the discharge pressure of said one pump for controlling the flow of fluid admitted to the other pump.

6. In combination with a pair of pumps having a common discharge conduit, a constantly open inlet for one pump, a controllable inlet for the other pump, and means including a valve for regulating said controllable inlet in accordance with variations in the fluid pressure in said discharge conduit.

CLARENCE W. LAUBIN.

REFERENCES CITED

The following references are of record in the file of this patent:

UNITED STATES PATENTS

| Number | Name | Date |
|---|---|---|
| 54,247 | Dennisson | Apr. 24, 1866 |
| 720,112 | Chase | Feb. 10, 1903 |
| 1,658,307 | Small | Feb. 7, 1928 |
| 1,770,297 | Bussmann | July 8, 1930 |
| 1,825,661 | Gull | Oct. 6, 1931 |
| 1,877,091 | Vickers | Sept. 13, 1932 |
| 1,884,852 | Pool | Oct. 25, 1932 |
| 1,969,076 | Hirsch | Aug. 7, 1934 |